United States Patent [19]

Gryglas

[11] 3,874,408

[45] Apr. 1, 1975

[54] CONTROL VALVE

[75] Inventor: Bogdan R. Gryglas, Woodbridge, Ill.

[73] Assignee: Efdyn Corporation, Chicago, Ill.

[22] Filed: Feb. 15, 1974

[21] Appl. No.: 442,815

[52] U.S. Cl. .............................................. 137/599
[51] Int. Cl. ............................................ F16k 11/10
[58] Field of Search .................................... 137/599

[56] References Cited
UNITED STATES PATENTS
2,475,783   7/1949   Gibbo ........................... 137/599 X
3,118,647   1/1964   Hasty ............................ 137/599 X
3,286,731   11/1966  Zajac ............................. 137/599

Primary Examiner—Robert G. Nilson
Attorney, Agent, or Firm—Johnson, Dienner, Emrich & Wagner

[57] ABSTRACT

The valve body has an inlet bore and an outlet bore. A cylinder valve element intersects the outlet bore and is manually rotatable to regulate or meter the flow of fluid between the inlet and outlet bores. An annular valve element within the valve body is axially movable automatically to effect equalization of the inlet and outlet fluid pressures whenever the latter exceeds the former.

3 Claims, 4 Drawing Figures

3,874,408
PATENTED APR 1 1975
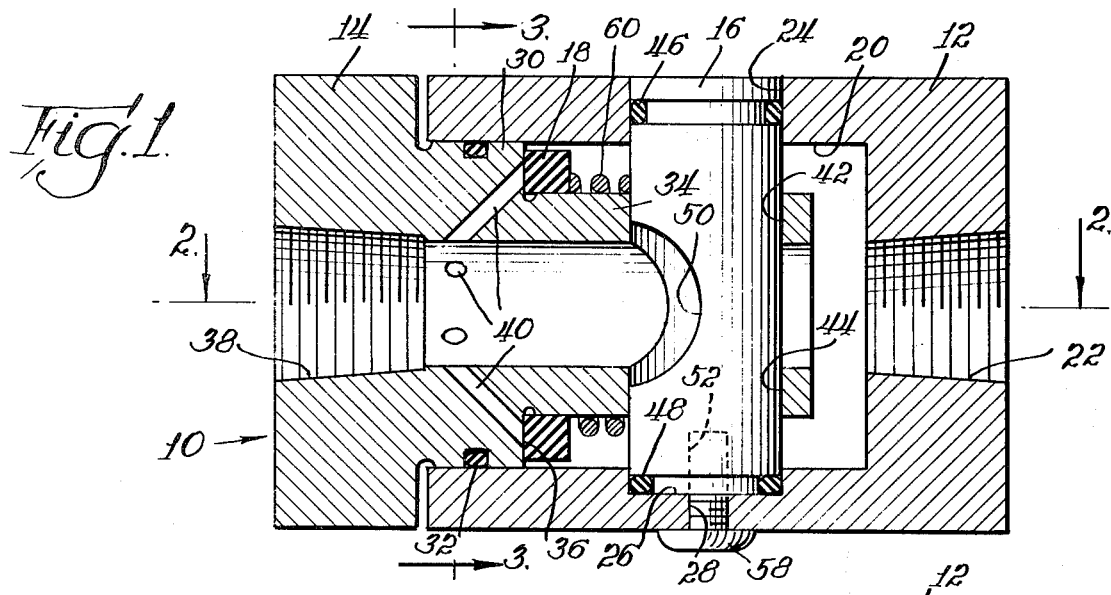
Fig. 1.
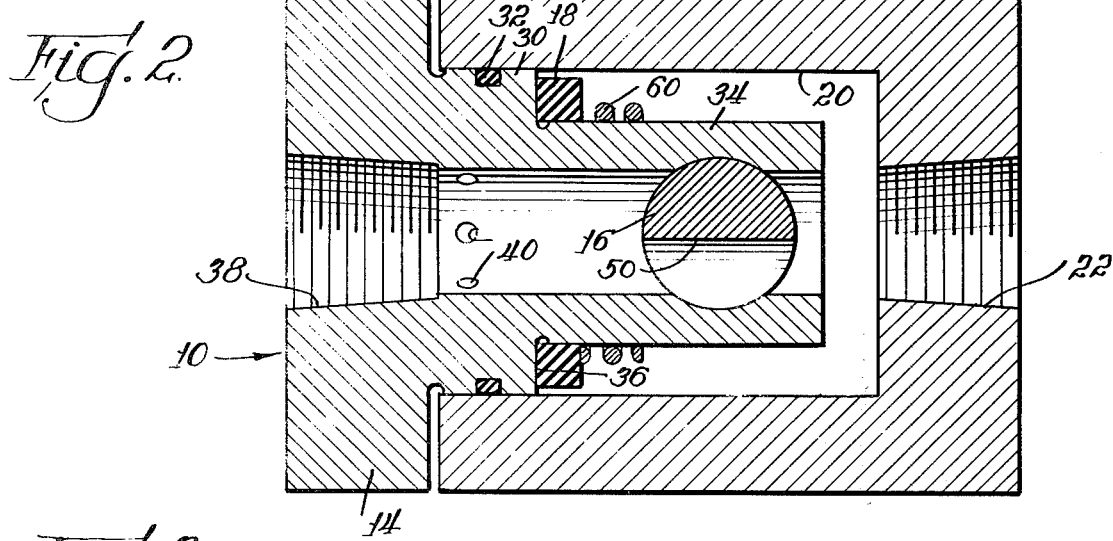
Fig. 2.
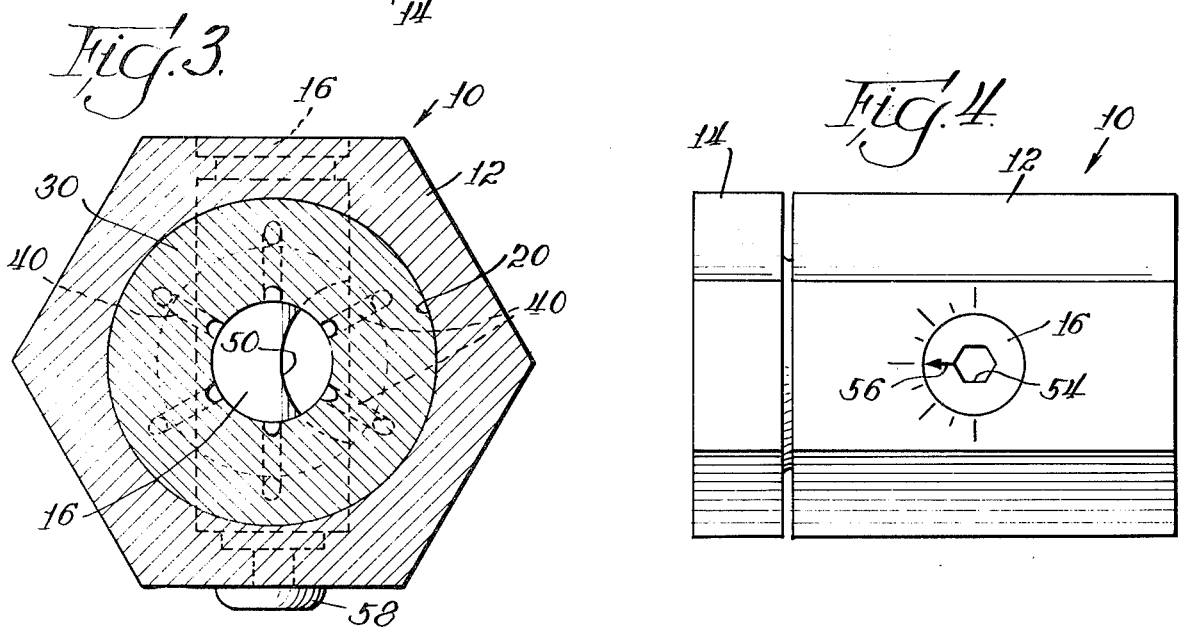
Fig. 3.
Fig. 4.

3,874,408

CONTROL VALVE

FIELD OF THE INVENTION

The present invention pertains to control valves used in fluid systems, for example, associated with fluid-controlled devices or fluid-functioning devices such as hydraulic shock absorbers.

SUMMARY OF THE INVENTION

It is an object of the present invention to provide a compact, inexpensive, efficient, manually adjustable flow-through metering valve with automatic inlet and outlet fluid pressure equalization.

To accomplish this object, the control valve of the present invention is constructed and functions in the following manner. A first body member has a main bore in one end thereof, and an inlet bore in the other end thereof communicating with the main bore. A second body member has a first section seated in the main bore, a second section of reduced cross section projecting into the main bore and defining with the first section a radial wall, an outlet bore therethrough for communication with the main bore, and at least one port communicating with the outlet bore and opening at the radial wall. A cylindrical flow-through valve element intersects the outlet bore and has a cross slot in one side thereof. This valve element is manually rotatable whereby the position of the cross slot relative to the outlet bore may be selectively adjusted to regulate the flow of fluid from the inlet bore and the main bore through the outlet bore. An annular valve element is normally engaged against the radial wall closing off the port. This valve element is axially movable automatically away from the radial wall when outlet fluid pressure exceeds inlet fluid pressure whereby the outlet bore is placed in communication with the main bore through the port for equalizing the fluid pressure therebetween.

BRIEF DESCRIPTION OF THE DRAWING

FIG. 1 is a median longitudinal sectional view of a control valve incorporating the principles of the present invention;

FIG. 2 is a longitudinal sectional view taken substantially along the line 2—2 in FIG. 1 looking in the direction indicated by the arrows, and shows the flow control valve element in a changed position;

FIG. 3 is a transverse sectional view taken substantially along the line 3—3 in FIG. 2 looking in the direction indicated by the arrows; and FIG. 4 is a plan view of the control valve of FIG. 1.

DESCRIPTION OF THE PREFERRED EMBODIMENT

Referring now to the drawing, there is indicated generally by the reference numeral 10 a control valve embodying the principles of the present invention.

The control valve 10 comprises a first body member 12, a second body member 14, a transverse cylindrical flow-through valve element 16, and an axially movable annular valve element 18.

The first body member 12 has a cylindrical main bore 20 in one end thereof, and an inlet bore 22 in the other end thereof communicating with the main bore 20. The first body member 12 is also formed with a cylindrical side opening 24, and an opposed cylindrical side recess 26 and aperture 28.

The second body member 14 has a first cylindrical section 30 seated in the main bore 20 with a suitable seal ring 32 disposed therebetween, and a second cylindrical section 34 of reduced cross section projecting into the main bore 20 coaxially thereof and defining with the first section 30 an annular radial wall 36. The second body member 14 is also formed with an outlet bore 38 therethrough for communication with the main bore 20, a plurality of ports 40 communicating with the outlet bore 38 and opening at the radial wall 36, and cylindrical side openings 42 and 44. The main bore 20, the inlet bore 22 and the outlet bore 38 are coaxially aligned. The first and second body members 12 and 14 may be conveniently fabricated from hexagonal bars.

The cylindrical valve element 16 is mounted in the side opening 24 and side recess 26 of the first body member 12 and in the side openings 42 and 44 of the second body member 14; and hence intersects the outlet bore 38. Suitable seal rings 46 and 48 are provided between the valve element 16 and the side opening 24 and side recess 26 respectively. The valve element 16 is formed with an arcuate cross slot 50 at one side thereof aligned with the outlet bore 38, and with an end threaded opening 52 aligned with the housing aperture 28. During assembly of the control valve 10, the valve element 16 may be conveniently inserted through the side opening 24.

The valve element 16 is rotatable whereby the position of the cross slot 50 relative to the outlet bore 38 may be selectively adjusted between a valve-closed position shown in FIG. 1 and a valve-open position shown in FIGS. 2 and 3. Such adjustment permits infinite regulation or metering of the flow of fluid—between zero-flow and maximum-flow—from the inlet bore 22 and the main bore 20 through the outlet bore 38.

As shown in FIG. 4, the exposed end of the valve element 16 is provided with a socket 54 for receiving a socket wrench or key (not shown) to accommodate rotation of the valve element 16, and with an arrow 56 to indicate the position of the cross slot 50. As shown in FIG. 1, a set screw 58 extends through the aperture 28 of the first body member 12 and is threaded into the end threaded opening 52 of the valve element 16. The set screw 58 is loosened when the valve element 16 is to be rotatably adjusted, and is tightened after adjustment of the valve element 16 whereby the latter may be locked in any preset rotative position.

The annular valve element 18 is normally engaged against the radial wall 36, by a coil spring 60 located about the second section 34 intermediate the valve element 16 and the valve element 18, for closing off the ports 40. The valve element 18 is movable axially away from the radial wall 36 by fluid pressure when outlet fluid pressure in the outlet bore 38 and ports 40 exceeds inlet fluid pressure in the main bore 20. Under these conditions, the outlet bore 38 is placed in communication with the main bore 20 through the ports 40 for equalizing the fluid pressure therebetween.

Operationally, the inlet and outlet bores 22 and 38 are connected by suitable conduit (not shown) in a conventional fluid system. The flow-through valve element 16 is manually adjustable for metering fluid flow between the inlet and outlet bores 22 and 38, while the valve element 18 functions automatically to equalize inlet and outlet fluid pressures whenever the latter exceeds the former.

While there has been shown and described a preferred embodiment of the present invention, it will be understood by those skilled in the art that various rearrangements and modifications may be made therein without departing from the spirit and scope of the invention.

The invention claimed is:

1. A control valve comprising a first body member having a main bore in one end thereof, and an inlet bore in the other end thereof communicating with said main bore; a second body member having a first section seated in said main bore, a second section of reduced cross section projecting into said main bore and defining with said first section a radial wall, an outlet bore therethrough for communication with said main bore, and at least one port communicating with said outlet bore and opening at said radial wall; a cylindrical valve element intersecting said outlet bore and having a cross slot in one side thereof, and said cylindrical valve element being rotatable whereby the position of said cross slot relative to said outlet bore may be selectively adjusted to regulate the flow of fluid from said inlet bore and said main bore through said outlet bore; an axially movable valve element normally engaged against said radial wall closing off said port, and said axially movable valve element being movable away from said radial wall when outlet fluid pressure exceeds inlet fluid pressure whereby said outlet bore is placed in communication with said main bore through said port for equalizing the fluid pressure therebetween; and spring means for normally engaging said axially movable valve element against said radial wall.

2. The control valve of claim 1 wherein said main bore and said first and second sections are cylindrical, said main bore and said inlet bore and said outlet bore are coaxially aligned, said radial wall is annular, said axially movable valve element is annular, and said spring means is located about said second section intermediate said cylindrical valve element and said axially movable valve element.

3. The control valve of claim 2 wherein one end of said cylindrical valve element is exposed at one side of said first body member to accommodate rotation of said cylindrical valve element, and including a set screw extending through said first body member and threaded into the other end of said cylindrical valve element whereby the latter may be locked in any preset rotative position.

* * * * *